United States Patent
Zhang et al.

(10) Patent No.: US 10,278,201 B2
(45) Date of Patent: Apr. 30, 2019

(54) METHOD FOR TRANSMITTING UPLINK GRANT AND BASE STATION

(71) Applicant: Sercomm Corporation, Taipei (TW)

(72) Inventors: Xu-Jing Zhang, Jiangsu Province (CN); Lin Cheng, Jiangsu Province (CN)

(73) Assignee: SERCOMM CORPORATION, Taipei (TW)

( * ) Notice: Subject to any disclaimer, the term of this patent is extended or adjusted under 35 U.S.C. 154(b) by 138 days.

(21) Appl. No.: 15/373,537

(22) Filed: Dec. 9, 2016

(65) Prior Publication Data
US 2017/0208615 A1 Jul. 20, 2017

(30) Foreign Application Priority Data
Jan. 18, 2016 (CN) .......................... 2016 1 0031096

(51) Int. Cl.
*H04L 5/00* (2006.01)
*H04W 72/12* (2009.01)
*H04W 72/14* (2009.01)

(52) U.S. Cl.
CPC ....... *H04W 72/1231* (2013.01); *H04L 5/0037* (2013.01); *H04L 5/0044* (2013.01); *H04L 5/0064* (2013.01); *H04L 5/0078* (2013.01); *H04L 5/0094* (2013.01); *H04W 72/14* (2013.01)

(58) Field of Classification Search
CPC .............. H04W 72/1231; H04W 72/14; H04L 5/0094; H04L 5/0078; H04L 5/0064; H04L 5/0037; H04L 5/0044
See application file for complete search history.

(56) References Cited

U.S. PATENT DOCUMENTS

| | | | |
|---|---|---|---|
| 8,634,397 B2* | 1/2014 | Johansson | H04L 47/10 370/341 |
| 2002/0046264 A1* | 4/2002 | Dillon | H04B 7/18584 709/219 |
| 2005/0259629 A1* | 11/2005 | Oliver | H04B 7/2659 370/345 |
| 2009/0143071 A1* | 6/2009 | Bergstrom | H04W 72/14 455/450 |
| 2012/0147840 A1* | 6/2012 | Chen | H04L 1/188 370/329 |
| 2013/0258914 A1* | 10/2013 | Seo | H04L 1/1896 370/280 |
| 2014/0056219 A1* | 2/2014 | Ye | H04L 69/16 370/328 |

(Continued)

FOREIGN PATENT DOCUMENTS

CN 102104974 A 6/2011

OTHER PUBLICATIONS

Office Action issued in corresponding Chinese patent application dated Jun. 6, 2018.

*Primary Examiner* — Ivan O Latorre
(74) *Attorney, Agent, or Firm* — McClure, Qualey & Rodack, LLP

(57) ABSTRACT

A method for transmitting an uplink grant message and a base station are provided. The method includes the following steps. Calculate a downlink speed currently used by a user equipment. Obtain a service type currently used by the user equipment. Determine whether to assign an uplink grant to the user equipment according to the downlink speed and the service type.

10 Claims, 3 Drawing Sheets

(56) References Cited

U.S. PATENT DOCUMENTS

2014/0219112 A1* 8/2014 Kherani ............... H04L 9/28
  370/252
2014/0372623 A1* 12/2014 Chen .................. H04L 47/30
  709/231
2017/0208619 A1* 7/2017 Yang ............... H04W 72/1284
2017/0289872 A1* 10/2017 Xiong ............... H04W 36/023

* cited by examiner

METHOD FOR TRANSMITTING UPLINK GRANT AND BASE STATION

This application claims the benefit of People's Republic of China application Serial No. 201610031096.7, filed Jan. 18, 2016, the subject matter of which is incorporated herein by reference.

BACKGROUND

Field of the Invention

The disclosure relates in general to a method for transmitting an uplink grant message and a base station, and more particularly to a transmission method that reduces the air interface delay between the base station and the user equipment.

Related Art

In a long term evolution (LTE) system, all the user equipments (UE) that establish connection to an evolved Node B (eNB) share the air interface resource. The eNB may dynamically assign transmission resource for each UE based on the data amount of the UE. It's an important issue regarding how the eNB reduces air interface delay between the eNB and the UE.

SUMMARY

One of the purposes of the invention is to provide a method for transmitting an uplink grant message and a base station, such that the base station is able to determine when to assign the uplink grant message to the user equipment in order to reduce the air interface delay.

According to one aspect of the invention, a method for transmitting an uplink grant message is provided. The method includes the following steps. Calculate a downlink speed currently used by a user equipment. Obtain a service type currently used by the user equipment. Determine whether to assign an uplink grant to the user equipment according to the downlink speed and the service type.

According to another aspect of the invention, a base station is provided. The base station includes a parameter calculation unit, a parameter configuration unit, a pre-grant user selection unit, and a user pre-scheduling unit. The parameter calculation unit is configured to calculate a downlink speed currently used by a user equipment. The parameter configuration unit is configured to obtain a service type currently used by the user equipment. The pre-grant user selection unit is configured to determine whether to assign an uplink grant to the user equipment according to the downlink speed and the service type. The user pre-scheduling unit is configured to assign the uplink grant to the user equipment.

The invention will become apparent from the following detailed description of the preferred but non-limiting embodiments. The following description is made with reference to the accompanying drawings.

Figure 1:
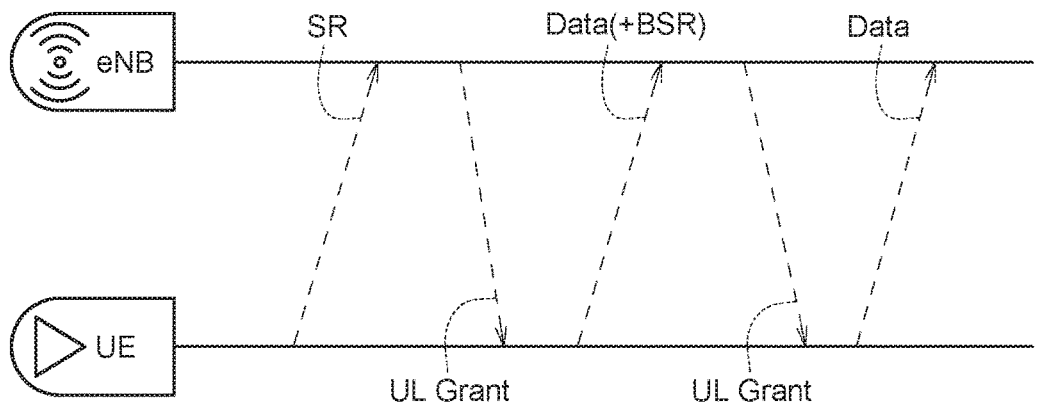
FIG. 1 shows a diagram of exemplary uplink data transmission between a base station and a UE.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

In the following embodiments, the LTE system architecture is taken as an example, where base stations may be represented as eNBs, which may include macro cells and small cells, such as HeNB. The user equipment is represented as UE. These terms will be used interchangeably in the following descriptions. Note that the LTE system is chosen for exemplary purpose, such that a person with ordinary skill in the art can understand the concept more easily. The invention is not limited to the LTE system. The method for transmitting an uplink grant message and the base station described below may also applied to other wireless communication technologies that include a base station and a user equipment, whatever their formal terminologies are under the technologies.

As compared to 2G/3G wireless communication system, 4G LTE technology brings enhancement in transmission speed, improving the user experience. For example, in a 4G time division duplex (TDD) LTE system, a downlink user datagram protocol (UDP) service of a single user may achieve a peak rate of 109 Mbits/s when using TDD frame structure configuration 2, normal cyclic prefix, and special subframe configuration 7. As for the transmission control protocol (TCP) service, due to the feedback mechanism, it may be difficult for the downlink speed to reach the same peak rate as the UDP service.

FIG. 1 shows a diagram of exemplary uplink data transmission between a base station and a UE. In the LTE system, the UE is in a radio resource control (RRC) connection state. When there is uplink data to be transmitted, the UE needs to perform the following procedure in order to transmit data to the eNB.

First, the UE detects there is data to be transmitted. If there is no uplink resource for transmission, the UE triggers a scheduling request (SR). Next, the eNB receives the scheduling request, and then schedules an uplink grant (UL Grant) with a fixed size. The fixed size of the UL Grant may be sufficient for the UE to upload the buffer status report (BSR). After the UE receives the UL Grant, the UE transmits uplink data and BSR. The UE reports its own buffer status to the eNB to provide reference information for the uplink grant sent by the eNB. When the eNB receives the BSR, the eNB may continue to assign the UL Grant based on the BSR, and the UE may continue the uplink data transmission based on the received UL Grant. The eNB may continue to assign the UL Grant until the BSR is scheduled completely.

There is acknowledgement/negative acknowledgment (ACK/NACK) feedback mechanism in the TCP service. Refer to the uplink transmission shown in FIG. 1, the ACK/NACK package of the TCP service is transmitted in the air interface, and thus it would require at least three times of data transmission between the UE and the eNB to complete the task, which greatly increases the air interface delay.

Further, in the TDD LTE system, because of the time division characteristic, the SR resource has a fixed period, such as sending the scheduling request for every 40 ms or 80 ms. The period of the uplink data transmission, including ACK/NACK, would not remain consistent with the period of the SR. That is, when the UE needs to transmit ACK/NACK, the UE has to wait the SR period to trigger the SR, which further increases the air interface delay.

For the TCP service, the TCP server may include a TCP buffer. The TCP buffer may store data that is still waiting the ACK/NACK sent from the UE. In other words, the data that has not received the ACK/NACK is stored in the TCP buffer. When the TCP buffer is full, the TCP server stops transmitting new data, thus reducing the TCP speed. In addition, the TCP calculation method determines that the data transmission rate of the server depends on the delay for receiving ACK/NACK. Even if the TCP buffer is not full, the TCP server no longer transmits data if the delay of ACK/NACK is too long.

As described above, the air interface delay of the ACK/NACK of the TCP service is an important factor that affects the TCP transmission rate in the LTE system. Moreover, not only the TDD LTE is affected, but also the transmission rate in the frequency division duplex (FDD) LTE is affected by the air interface delay of the ACK/NACK of the TCP service.

Figure 2:
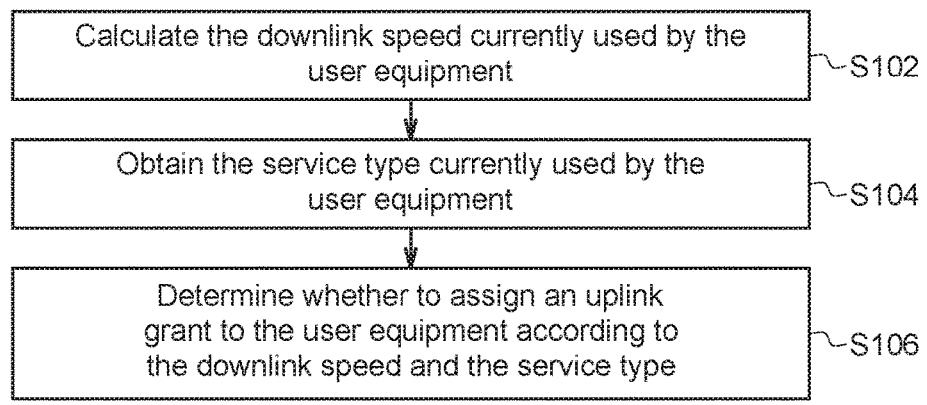
FIG. 2 shows a flowchart illustrating a method for transmitting an uplink grant message according to one embodiment of the invention.

FIG. 2 shows a flowchart illustrating a method for transmitting an uplink grant message according to one embodiment of the invention. The method includes the following steps. Step S102: calculate a downlink speed currently used by a user equipment. Step S104: obtain a service type currently used by the user equipment. Step S106: determine whether to assign an uplink grant to the user equipment according to the downlink speed and the service type.

Figure 3:
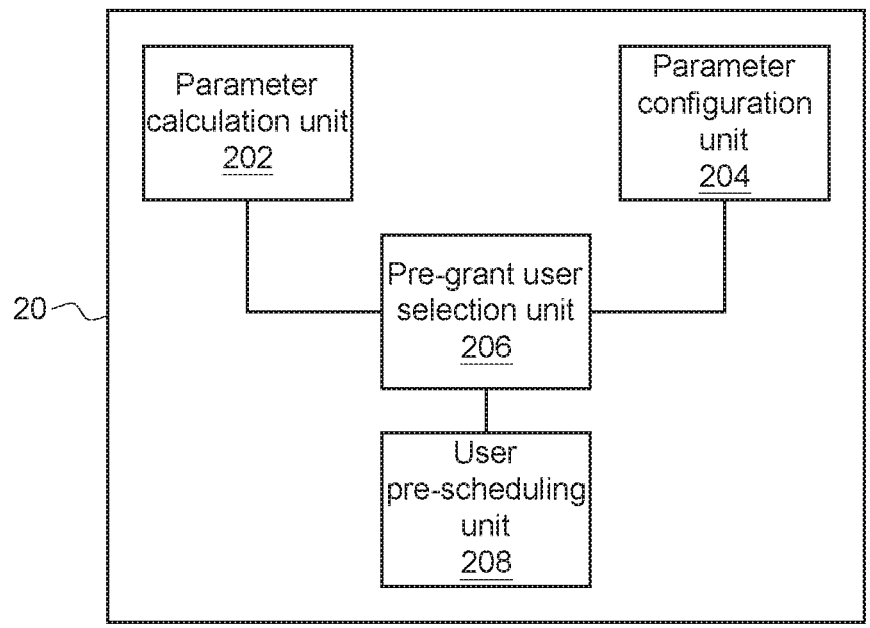
FIG. 3 shows a diagram illustrating a base station according to one embodiment of the invention.

The method for transmitting the uplink grant message in the above embodiment may be applied to a base station, such as the eNB in the LTE system. FIG. 3 shows a diagram illustrating a base station according to one embodiment of the invention. The base station 20 may perform wireless communication with one or more user equipment 40. The base station 20 includes a parameter calculation unit 202, a parameter configuration unit 204, a pre-grant user selection unit 206, and a user pre-scheduling unit 208. The parameter calculation unit 202 is configured to calculate a downlink speed currently used by the user equipment 40. The parameter configuration unit 204 is configured to obtain a service type currently used by the user equipment 40. The pre-grant user selection unit 206 is configured to determine whether to assign an uplink grant to the user equipment 40 according to the downlink speed and the service type. The user pre-scheduling unit 208 is configured to assign the uplink grant to the user equipment 40.

The base station 20 shown in FIG. 3 is an exemplary implementation. The base station 20 may carry out the method for transmitting the uplink grant message as shown in FIG. 2. Each unit of the base station 20, including the parameter calculation unit 202, the parameter configuration unit 204, the pre-grant user selection unit 206, and the user pre-scheduling unit 208, may be implemented by hardware circuit or software module to perform the corresponding function. For example, the base station 20 may include a processor circuit and a memory. The software may be stored in the memory, and the program instruction of the software may be loaded by the processor circuit to execute the corresponding function.

Based on the method for transmitting the uplink grant message and the base station, because an uplink pre-grant is assigned to the user equipment 40 (referring to the step S106, and the user pre-scheduling unit 208), the user equipment 40 does not have to transmit SR when performing uplink transmission of ACK/NACK. Since the SR scheduling is prevented, the air interface delay of ACK/NACK is reduced, and hence the data transmission rate in the system is enhanced. Each step of the method for transmitting the uplink grant message and each unit of the base station is described below.

The parameter calculation unit 202 may be configured to calculate current real time air interface information of the user equipment 40, such as data transmission rate and other parameters. When there is downlink data transmission between the base station 20 and the user equipment 40, the parameter calculation unit 202 may calculate the downlink speed of the user equipment 40, and pass the calculation result to the pre-grant user selection unit 206 (referring to the step S102).

The parameter configuration unit 204 may be configured to receive information parameters related to the user equipment 40. For example, the parameter configuration unit 204 may receive parameters from a management unit in the core network. Take LTE system as an example, the core network is the evolved packet core (EPC). The parameter configuration unit 204 may receive information parameters related to the user equipment 40 from the mobility management entity (MME) in the EPC through S1 private protocol. The information parameters may include the service type currently used by the user equipment 40. The service type may include a TCP service and a UDP service. The parameter configuration unit 204 may pass the obtained result to the pre-grant user selection unit 206 (referring to the step S104).

When the user equipment 40 has downlink data transmission, the pre-grant user selection unit 206 may determine whether or not to assign the uplink grant to the user equipment 40 according to the downlink speed (from the parameter calculation unit 202) and the service type (from the parameter configuration unit 204). In one embodiment, when the downlink speed is greater than a speed threshold, and when the service type is a TCP service, the pre-grant user selection unit 206 is configured to assign the uplink grant to the user equipment 40. The pre-grant user selection unit 206 may pass the determination result to the user pre-scheduling unit 208 (referring to the step S106). Note that the service types that make the determination result affirmative in the step S106 may include not only the TCP service, but also other protocols involving the feedback mechanism, such as stream control transmission protocol (SCTP), trivial file transfer protocol (TFTP), etc. Because when there is an ACK/NACK delay problem in protocols that adopt feedback mechanism, the method shown in FIG. 2 may be performed to reduce the uplink delay. For those protocols involving the feedback mechanism, TCP is taken as a representative example in the following description.

As described above, because the TCP service has the ACK/NACK feedback mechanism, the air interface delay is increased. When the service type is the TCP service, and when the downlink speed of the user equipment 40 is greater than the speed threshold, it represents that the user equipment 40 probably has a large amount of downlink data transmission, and therefore it is expected that the user equipment 40 is going to send ACK/NACK to the base station 20. The affirmative determination result of the pre-grant user selection unit 206 represents that the base station 20 predicts that the user equipment 40 is going to send ACK/NACK in an upcoming period of time. This period of time will be called a pre-grant time duration in the following description, and may be set as a value T_ulGrant_Timer. Therefore the user pre-scheduling unit 208 may assign the uplink grant to the user equipment 40 in the pre-grant time duration to perform pre-scheduling, such that the user equipment 40 is exempted from sending the scheduling request to the base station 20.

Figure 4:
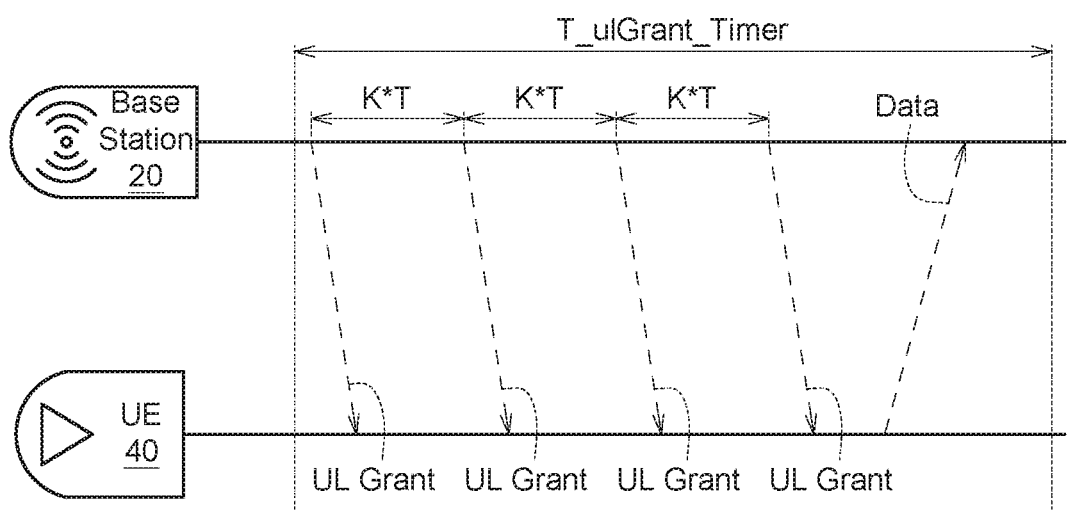
FIG. 4 shows a diagram illustrating data transmission between the base station and the UE according to one embodiment of the invention.

In one embodiment, the user pre-scheduling unit 208 is configured to assign the uplink grant to the user equipment 40 every fixed period in the pre-grant time duration. FIG. 4 shows a diagram illustrating data transmission between the base station and the UE according to one embodiment of the invention. After the pre-grant user selection unit 206 determines that the user equipment 40 meets the pre-grant criteria (predicting the user equipment 40 will transmit ACK/NACK), the pre-grant user selection unit 206 may inform the user pre-scheduling unit 208 to assign the uplink grant to the user equipment 40 every fixed period in the pre-grant time duration T_ulGrant_Timer. Because the user equipment receives the uplink grant continually, when the user equipment 40 needs to send ACK/NACK, the user equipment 40 does not have to send a scheduling request to the base station 20. Reducing delay caused by asking for and waiting for permission to send ACK/NACK, the downlink transmission rate of the TCP service is enhanced. The fixed period that the uplink grant is assigned may be represented as K×T, where T is the minimum time period that allows an uplink transmission opportunity, and K may be a positive integer. The value of K may be determined according to several factors, including the utilization rate of air interface resource and the transmission speed of the user equipment 40. For example, K is recommended as 1 when the air interface resource and the transmission speed of the user equipment 40 meets a certain criterion.

The pre-grant as mentioned above may act as an uplink grant that allows the user equipment to transmit ACK/NACK in the uplink direction. In one embodiment, the size of the uplink grant (that is assigned by the base station 20 to the user equipment 40) is sufficient for the user equipment 40 to uplink transmit an ACK/NACK package. For example, the size of the initial uplink grant may be set as ACK/NACK_min_Grant_Size, and the size of the subsequent uplink grant may be the maximum value of the two values including ACK/NACK_min_Grant_Size and BSR_Grant_Size, where BSR_Grant_Size is determined by the base station 20 according to the BSR reported by the user equipment 40. When the user equipment 40 has uplink data for transmission, the user equipment 40 can use the pre-scheduled grant for data transmission, where the data transmitted by the user equipment 40 may include other uplink data in addition to the ACK/NACK message.

Because the base station 20 is capable of communicating wirelessly with multiple user equipments 40, the method for transmitting the uplink grant message and the base station 20 as described in the above embodiment may be applied to a scenario where the base station 20 considers multiple user equipments at the same time. For example, the pre-grant user selection unit 206 may be configured to determine whether or not each user equipment within the coverage area of the base station 20 needs the pre-grant. If a user equipment is found to satisfy the pre-grant condition, the user equipment may be added to a pre-grant user queue, recording which user equipments in the coverage area currently need the pre-grant. The pre-grant user selection unit 206 may pass the pre-grant user queue to the user pre-scheduling unit 208.

In addition to the downlink speed and the service type currently used by the user equipment 40, there may be other criteria for determining whether or not the user equipment 40 needs the pre-grant. In one embodiment, the criteria include the TCP window utilization rate of the server of the TCP service. The size of TCP window is related to the data quantity allowed to be stored in the TCP buffer in the server. When the TCP window utilization rate is greater than a utilization threshold, there is probably too much data stored in the TCP buffer in the server, representing there is much data that has not yet received ACK/NACK from the user equipment 40. Therefore it may be predicted that the user equipment is going to send ACK/NACK in this case. That is, the pre-grant user selection unit 206 may be configured to assign the uplink grant to the user equipment 40 when the TCP window utilization rate is greater than the utilization threshold. The TCP window utilization rate may be calculated by the parameter configuration unit 204. In one embodiment, the TCP window utilization rate may be calculated by the core network and then transmitted to the parameter configuration unit 204 through S1 private protocol.

In one embodiment, the criteria for determining whether or not to perform pre-grant also include the signal quality of the user equipment 40. For example, the signal quality may be the channel quality indicator (CQI). The base station 20 may set a signal quality threshold. When the signal quality of the user equipment 40 is less than the signal quality threshold, the user equipment 40 is probably located near the edge of the cell coverage area served by the base station 20. Because the transmission signal quality between the user equipment 40 and the base station 20 is not good enough, the data transmission rate may not be able to reach the peak rate in this case. That is, the air interface delay incurred by ACK/NACK of the TCP service probably does not has huge impact on the data transmission rate of the user equipment 40. Therefore no pre-grant is performed on the user equipment 40 in this case. On the other hand, when the signal quality of the user equipment 40 is greater than the signal quality threshold, the air interface delay incurred by ACK/NACK probably has a greater impact on the data transmission rate. Therefore the pre-grant user selection unit 206 is configured to assign the uplink grant to the user equipment 40 when the signal quality of the user equipment 40 is greater than the signal quality threshold.

Figure 5:
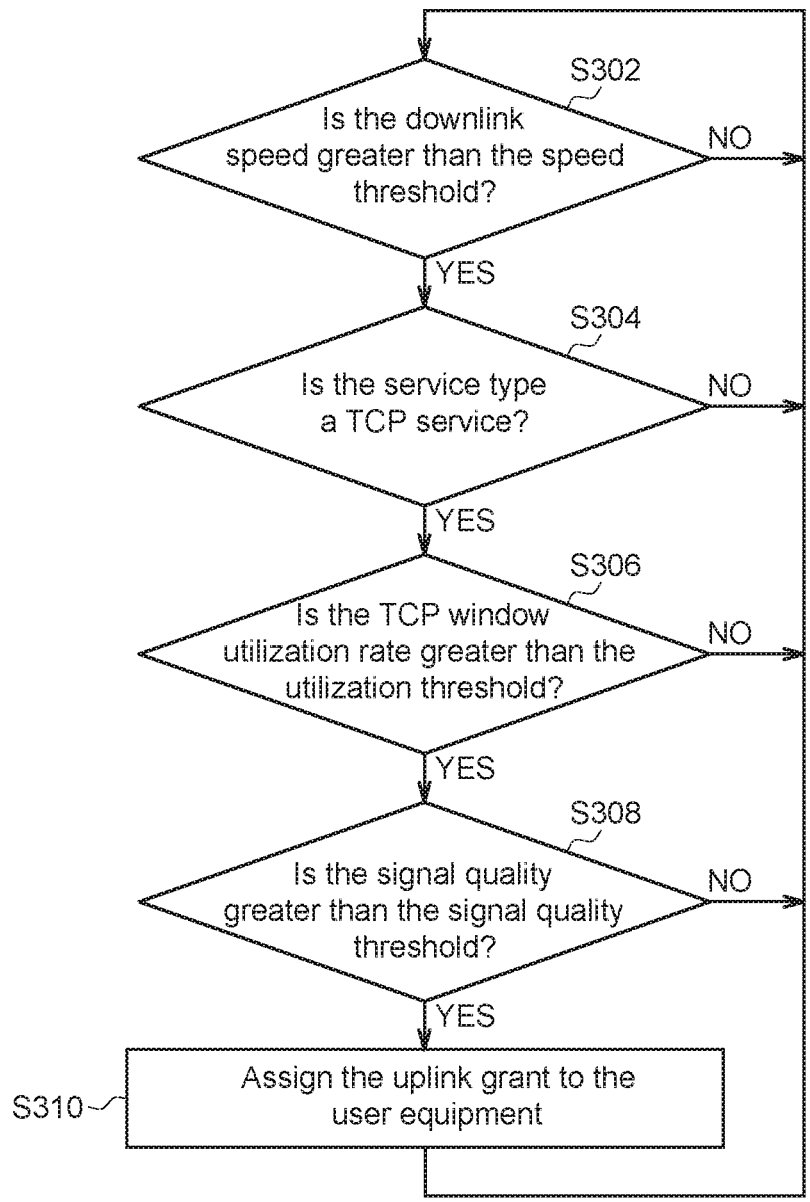
FIG. 5 shows a flowchart illustrating a method for transmitting an uplink grant message according to one embodiment of the invention.

FIG. 5 shows a flowchart illustrating a method for transmitting an uplink grant message according to one embodiment of the invention. In this embodiment the method includes the following steps. Step S302: determine whether or not the downlink speed is greater than the speed threshold. Step S304: determine whether or not the service type is a TCP service. Step S306: determine whether or not the TCP window utilization rate is greater than the utilization threshold. Step S308: determine whether or not the signal quality is greater than the signal quality threshold. If the determination results of the above four steps are all yes, proceed to step S310: assign the uplink grant to the user equipment. Otherwise, if any of the determination results is no, go back to the step S302 and then repeat the above determination steps.

In one embodiment, the steps S306 and S308 shown in FIG. 5 may be optional additional steps. These two steps may be omitted. That is, whether to perform step S310 may be determined based on the determination results of the steps S302 and S304. In one embodiment, one of the steps S306 and S308 may be added to the steps S302 and S304 to yield a more strict determination criterion for performing the step S310. By adding the step S306 and/or the step S308, the current usage state of the user equipment 40 may be further examined to provide a more accurate prediction result regarding whether to assign a pre-grant message. This prevents a waste in the air interface uplink interface, which may occur when the base station 20 sends an uplink grant message without receiving ACK/NACK from the user equipment 40.

According to the method for transmitting the uplink grant message and the base station in the above embodiments, the situation that the user equipment is about to send uplink data can be predicted, and an uplink grant message can be pre-assigned to the user equipment. This can exempt the user equipment from sending the scheduling request, and also effectively reduce the air interface delay incurred by asking for and waiting for permission to send ACK/NACK. Furthermore, multiple usage states of the user equipment can be taken into consideration to provide a more accurate prediction result, preventing a waste of air interface resource between the base station and the user equipment.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method for transmitting an uplink grant message, adapted to a base station, the method comprising:
   calculating a downlink speed currently used by a user equipment;
   obtaining a service type currently used by the user equipment; and
   determining whether to assign an uplink grant to the user equipment according to the downlink speed and the service type;
   wherein the step of determining whether to assign the uplink grant to the user equipment comprises:
   determining whether to assign the uplink grant to the user equipment further according to a TCP window utilization rate of a server; and
   when the downlink speed is greater than a speed threshold, when the service type is a TCP service, and when a TCP window utilization rate is greater than a utilization rate threshold, determining to assign the uplink grant to the user equipment.

2. The method according to claim 1, wherein the step of determining whether to assign the uplink grant to the user equipment comprises:
   determining whether to assign the uplink grant to the user equipment further according to a signal quality of the user equipment.

3. The method according to claim 2, wherein the step of determining whether to assign the uplink grant to the user equipment comprises:
   when the downlink speed is greater than a speed threshold, when the service type is a TCP service, and when the signal quality is greater than a signal quality threshold, determining to assign the uplink grant to the user equipment.

4. The method according to claim 1, further comprising:
   assigning the uplink grant to the user equipment every fixed period in a pre-grant time duration.

5. The method according to claim 1, wherein a size of the uplink grant is sufficient for the user equipment to transmit an ACK/NACK package.

6. A base station, comprising:
   a parameter calculation unit, configured to calculate a downlink speed currently used by a user equipment;
   a parameter configuration unit, configured to obtain a service type currently used by the user equipment;
   a pre-grant user selection unit, configured to determine whether to assign an uplink grant to the user equipment according to the downlink speed and the service type; and
   a user pre-scheduling unit, configured to assign the uplink grant to the user equipment;
   wherein the parameter calculation unit, the parameter configuration unit, the pre-grant user selection unit, and the user pre-scheduling unit are implemented by hardware circuit, or the base station includes a processor circuit and a memory which stores program instructions which are configured to be loaded by the processor circuit to execute the function of the parameter calculation unit, the parameter configuration unit, the pre-grant user selection unit, and the user pre-scheduling unit;
   wherein the parameter configuration unit is further configured to obtain a TCP window utilization rate of a server, and the pre-grant user selection unit is configured to determine whether to assign the uplink grant to the user equipment further according to the TCP window utilization rate; and
   wherein the pre-grant user selection unit is configured to assign the uplink grant to the user equipment when the downlink speed is greater than a speed threshold, the service type is a TCP service, and a TCP window utilization rate is greater than a utilization rate threshold.

7. The base station according to claim 6, wherein the parameter calculation unit is further configured to calculate a signal quality of the user equipment, and the pre-grant user selection unit is configured to determine whether to assign the uplink grant to the user equipment further according to the signal quality.

8. The base station according to claim 7, wherein the pre-grant user selection unit is configured to assign the uplink grant to the user equipment when the downlink speed is greater than a speed threshold, the service type is a TCP service, and the signal quality is greater than a signal quality threshold.

9. The base station according to claim 6, wherein the user pre-scheduling unit is configured to assign the uplink grant to the user equipment every fixed period in a pre-grant time duration.

10. The base station according to claim 9, wherein a size of the uplink grant is sufficient for the user equipment to transmit an ACK/NACK package.

* * * * *